United States Patent [19]

Boeckmann

[11] Patent Number: 4,718,083

[45] Date of Patent: Jan. 5, 1988

[54] DIFFERENTIAL RECEIVE BOOSTER AMPLIFIER FOR TELEPHONE INSTRUMENTS

[75] Inventor: Eduard F. B. Boeckmann, Huntsville, Ala.

[73] Assignee: GTE Communication Systems Corporation, Phoenix, Ariz.

[21] Appl. No.: 778,992

[22] Filed: Sep. 23, 1985

[51] Int. Cl.⁴ .................................. H04M 1/58
[52] U.S. Cl. ........................ 379/392; 379/395
[58] Field of Search .......... 179/81 A, 81 B, 170 NC; 379/340, 345, 405, 391, 392, 395, 398, 399, 387

[56] References Cited

U.S. PATENT DOCUMENTS

| | | | |
|---|---|---|---|
| 3,529,099 | 9/1970 | Ribner | 379/395 |
| 3,909,559 | 9/1975 | Taylor | 379/405 |
| 3,974,344 | 8/1976 | Mersich | 379/395 |
| 4,031,331 | 6/1977 | Sencer | 379/395 |
| 4,163,878 | 8/1979 | Hashemi | 379/340 |

OTHER PUBLICATIONS

Signetics Digital Linear MOS, Signetics Corporation Integrated Circuit Catalog, 1972, pp. 6-7 to 6-11.
Analysis and Design of Analog Integrated Circuits, Paul Gray et al., John Wiley and Sons, New York, 1977, pp. 332-341.

Primary Examiner—Jin F. Ng
Assistant Examiner—R. Vaas
Attorney, Agent, or Firm—Robert J. Black

[57] ABSTRACT

An amplifier having properties of natural side tone balancing based on the utilization of a bridge arrangement, high efficiency with resulting high gain, high AC impedance and compatibility with electret microphones and electret microphone amplifiers. A matched pair of differential transistors arranged as part of a bridge circuit form a detector of the receive signal at one input versus a transmit signal which appears at both inputs in the same phase and therefore is rejected as a common mode signal. The resultant balancing of side tone and high gain finds particular application in telephone networks where the characteristics dictate the need for higher than usual receive gain or for use by auditorially handicapped users over a normal telephone network.

7 Claims, 2 Drawing Figures

DIFFERENTIAL RECEIVE BOOSTER AMPLIFIER FOR TELEPHONE INSTRUMENTS

BACKGROUND OF THE INVENTION

1. Technical Field

The present invention relates to amplifiers and more particularly to an amplifier for use with a telephone receiver.

2. Background Art

Since the advent of the invention of the transistor, many attempts have been made to design telephones replacing the old style voice coil or inductive network with solid state components. In some cases discrete transistors and other components have been used. In other cases integrated circuits have been developed to replace the voice coil network with an equivalent solid state network. Some of the attempts have been successful and others have not. There are several problems encountered. The first of these is a problem with DC power dissipation and DC current supervision of the loop current employed over the telephone line and associated network. Incorrect loop supervision will cause a malfunction of the telephone instrument under certain conditions. For example, the telephone instrument must present less than 300 Ohms DC resistance *to the telephone loop. Secondly, the AC impedance of the instrument should be 600 Ohms. This impedance is difficult to achieve and still provide a high receive gain. A third problem is that the circuit must be stable on all loops in spite of the relatively high impedance nature of the device. A related problem here also is the susceptibility to radio frequency signals with a tendency to pick up and reproduce said signals. A fourth problem involves the audio characteristics which must be within recognized standards. Relative to the receive characteristics this means that the receive level must be at least adequate to prescribe levels over the audio frequency range applicable to telephone communications and yet not too loud. Usually though the levels achieved are not too loud and in some cases they are not loud enough. The present invention is intended to provide loudness that is higher than average but not too loud especially when the application requires extra gain for the received signal. Finally whatever method of providing receiving amplification is used the receiving amplifier must be compatible with some type of transmit amplifier so that the side tone employed can be balanced properly.

Various types of receive amplifier circuits are found in the industry. For example, the GTE NXT telephone manufactured by GTE Communication Systems Corporation uses an operational amplifier technique as do a number of commercially available electronic voice network integrated circuits. Two examples of this are that manufactured by National under their part number TP5700 and that manufactured by Phillips under the part number TER1060-1062 series.

In most of these circuits a phase shifted transmit signal is applied along with the out of phase shifted signal to the receive amplifier input for side tone balance. It is therefore difficult in these circuits to balance the side tone and still have a strong receive amplification factor. In the present invention it has been found that it inherently has side tone cancellation properties due to the differential nature and the method of use employed in the device.

SUMMARY OF THE INVENTION

In the present invention a pair of differential transistors (matched) are arranged as part of a bridge circuit wherein the differential transistors form a detector of the receive signal at one input, versus a transmit signal which appears at both inputs in the same phase and is therefore rejected as a common mode signal. The degree of rejection is determined by the common mode rejection ratio for the circuit as determined by the circuit component parameters. One input terminal receives a higher receive signal than the other because of the arrangement of the bridge connections in the instrument which allow virtually direct connection of the loop to one differential input amplifier with the other input receiving the attenuated signal.

The action employed is therefore to amplify the receive signal differentially over the transmit signal in the receiver transducer, side tone is therefore greatly attenuated especially when the bridge arm affecting side tone is matched to the loop. Normally a single impedance is set in this arm to achieve the best overall match of the system. A varistor or voltage sensitive resistance could also be used in the bridge arm to provide dynamic loop matching and DC current supervision. The most important aspect of the invention is the application of the differential amplifier under bridge arrangement for high amplification of received signals with natural balancing of side tone due to the inherent nature of the device.

In the circuit implementation a first NPN transistor acts as current source feeding the collectors of the NPN differential matched transistor pair. Two collector load resistors balance current through the matched pair under quiescent conditions and act as the individual AC loads for the pair. The receiver transducer is connected between the collectors of the two matched transistors, through a large value DC blocking capacitor. This capacitor prevents undesirable DC current from flowing through the receiver while allowing any differential AC signal to pass through.

A fourth NPN transistor provides a high impedance current source for the differential pair. This transistor is biased on with a diode connected transistor from its base to common with a capacitor for AC bypass. The bias current is fed from a divider resistor string that also supplies bias current for the aforementioned transistor. Bias for the differential pair is delivered by resistors connected from their collectors to each base of the differential pair.

One base of the differential pair is driven from the loop input side of the bridge circuit through a coupling capacitor. The other base is driven from the opposite bridge mode also through a coupling capacitor. This second mode is the side tone balance network connection point. The side tone network consists of a large value coupling capacitor to an impedance selected to match the loop resistance. Two resistors of approximately 100 Ohms each form the two upper impedance arms of the bridge circuit and pass an equal transmit signal to each transistor of the differential pair. The transmit signal is therefore a common mode signal and is mostly rejected by the differential receive amplifier. The degree of rejection will depend on the common mode rejection ratio and the degree of match between the aforementioned side tone balance network and the telephone loop impedance.

In the present invention the method of using a differential receive amplifier and a bridge circuit in order to balance side tone and match impedances as described above should be considered the principle feature of the invention which finds its best utilization in telephone instruments built for use in those applications where network characteristics dictate the need for a higher than usual receive gain or for use on a normal network but with an auditorially handicapped user. The present invention is not necessarily intended to provide compatibility with hearing aid devices. The circuitry employed may be applicable to all electronic or solid state telephone instruments in either discrete or integrated circuit form.

It should be noted that the complete telephone circuitry is not shown and that the present invention is compatible with the number of different types of circuits and such circuitry does not form a portion of the present invention.

DESCRIPTION OF THE PREFERRED EMBODIMENT

Figure 1:
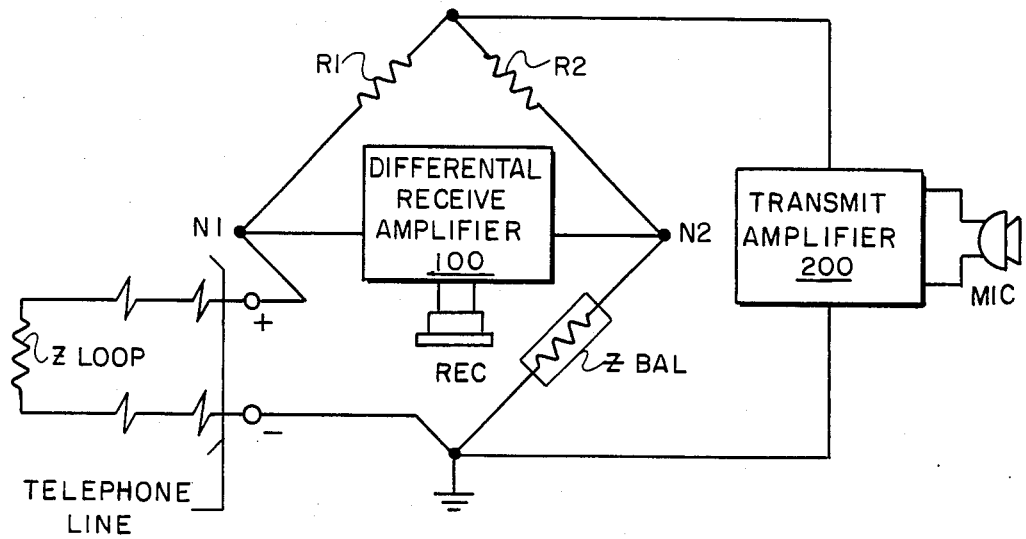
FIG. 1 of the accompanying drawings is an overall block diagram of a differential receive booster amplifier in accordance with the present invention.

Referring first to FIG. 1, the differential receive amplifier 100 is shown in its bridge circuit environment. Note that when the balancing impedance (Z BAL) is approximately equal to the impedance of the telephone line loop (Z LOOP), then a signal from the transmit amplifier will divide equally between the branches R1-Z LOOP and R2-Z BAL when resistor R1 is equal to resistor R2. Therefore the signal at node N1 and node N2 are identical and in the same phase. This is an important consideration in the present invention.

Figure 2:
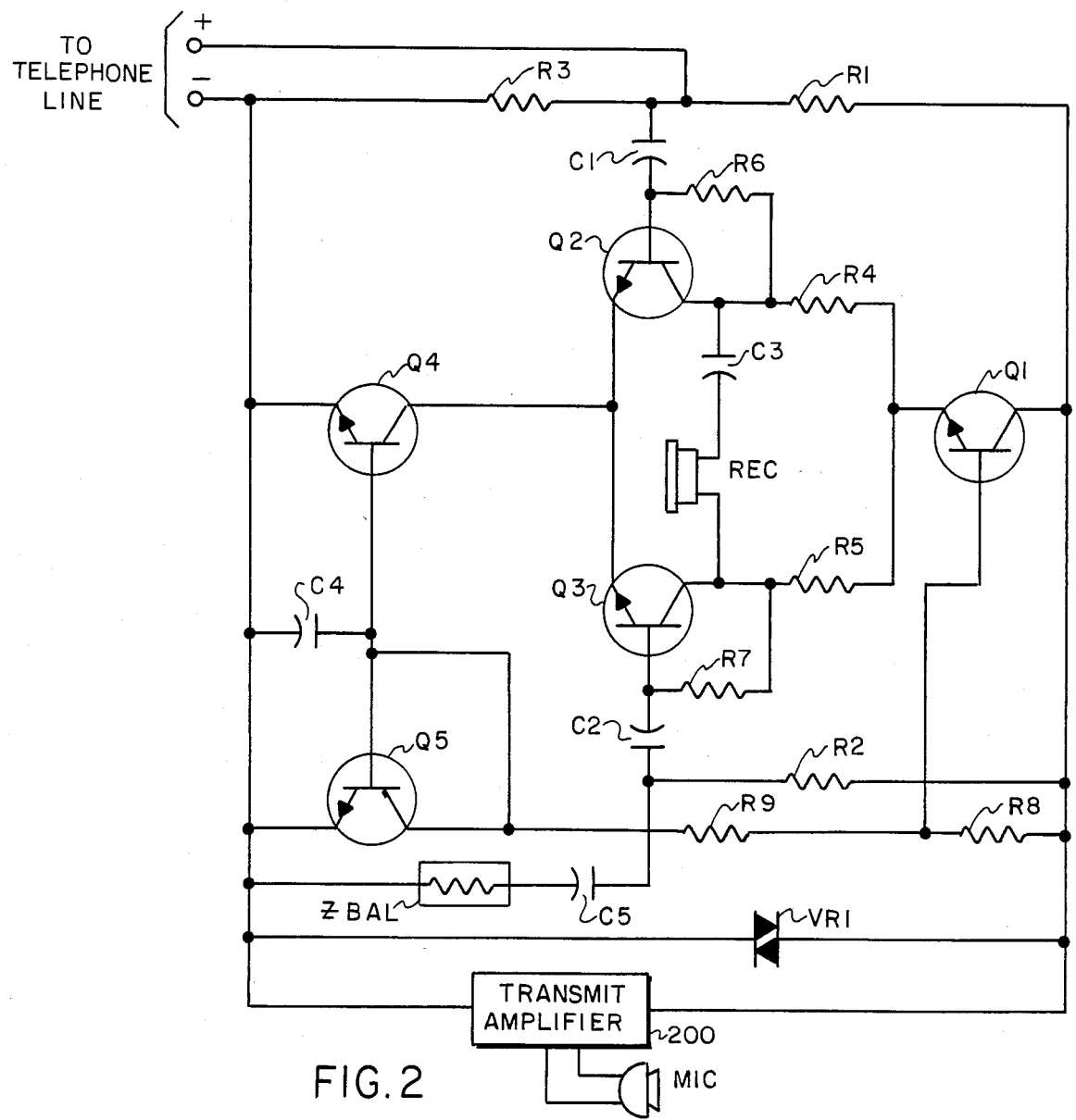
FIG. 2 is simplified schematic of a portion of a telephone instrument circuit employing a differential receive booster amplifier in accordance with the present invention.

Referring now to FIG. 2, a more detailed but still simplified diagram of the invention is shown. In this circuit, resistor R1 and resistor R2 correspond to resistor R1 and R2 of FIG. 1 and are therefore the upper arms of the bridge circuit. Resistor R3 is an impedance adjusting resistor required to meet telephone impedance requirements. Resistors R4 and R5 supply the collector load resistors for the differential pair consisting of transistors Q3 and Q2. Resistors R6 and R7 supply bias current for the differential transistor pair. Transistor Q1 in turn provides a source of current for the differential pair and transistor Q4 provides a high impedance current sink for the emitters of the differential pair.

One of the more important aspects of the present invention is the ability of the device to achieve a high AC input impedance reflected back to the telephone loop. This effect is achieved by the combined function of transistors Q1, Q4 and Q5. Proper biasing of transistors Q1 and Q4 is determined economically by resistors R8 and R9. Capacitor C4 serves to increase the impedance of the current sink transistor Q4 and capacitor C1, C2 and C3 serve as DC blocking devices and AC coupling elements for input, side tone and output to the receiver REC. Capacitor C5 is also a DC blocking capacitor but allows AC bridge balancing signals to enter the side tone impedance network Z BAL. Varistor VR1 and resistor R3 are optional elements for DC current supervision and impedance adjustment as required, depending on the type of transmitter used and its DC and AC characteristics.

The present device has been shown to work efficiently with low impedance receivers of 125 Ohms and greater. The device has also been shown to be compatible with the electret type microphone amplifiers employed in many modern telephones circuits with an appropriate AC impedance so that the combination of receiver amplifier and microphone amplifier impedance effectively matches the telephone loop impedance. Thus from the foregoing the advantages of the present invention include the natural side tone balancing of the bridge arrangement, the high efficiency achieved in the receive amplifier leading to a high gain and the high AC impedance achieved as well as compatibility with electrets and electret microphone amplifiers.

While but a single embodiment of the present invention has been shown it will be obvious to those skilled in the art that numerous modifications may be made to the present invention without departing from the spirit of the invention which shall be limited only by the scope of the claims appended hereto.

What is claimed is:

1. A subscriber's telephone instrument circuit connected to a telephone line and including, a microphone connected to a transmit amplifier, a receiver connected to a receive amplifier and interface means connecting said amplifiers to said telephone line said interface means comprising:

a bridge circuit including first, second, third and fourth arms;

said fourth arm including said telphone line;

said transmit amplifier including a first output circuit connection to a juncture between said first and second bridge arms and a second output circuit connection to a juncture between said third and fourth bridge arms;

said receive amplifier being of the differential type including first and second transistors, the characteristics of each one of said transistors being matched to the other; and said receive amplifier further including a first input circuit connection to a juncture between said first and fourth bridge arms and second input circuit connection to a juncture between said second and third bridge arms; wherein signals transmitted from said microphone and amplified by said transmit amplifier appear on said transmit amplifier first and second circuit connections to said receive amplifier in the same phase and therefore rejected by said receive amplifier as a common mode signal; and signals received from said telephone line appearing at said first and second circuit connections to said receive amplifier are of opposite phase and therefore amplified by said receive amplifier and then transmitted to said receiver for reproduction thereby.

2. A subscriber's telephone instrument circuit as claimed in claim 1, wherein: said bridge circuit first and second arms each include a resistance.

3. A subscriber's telephone instrument circuit as claimed in claim 1, wherein: said bridge circuit third arm includes impedance balancing means.

4. A subscriber's telephone instrument circuit as claimed in claim 3, wherein: said impedance balancing means is matched to the impedance of said telephone line.

5. A subscriber's telephone instrument circuit as claimed in claim 1, wherein: said receive amplifier further includes a third transistor functioning as a current source for said first and second transistors.

6. A subscriber's telephone instrument circuit as claimed in claim 1, wherein: said receive amplifier first and second transistors each include an input connected to said first and second circuit connections respectively and each further include an output circuit connection to said receiver.

7. A subscriber's telephone instrument circuit as claimed in claim 5, wherein: said receive amplifier further includes a fourth transistor including a circuit connection to said first and second transistors, operated to provide a high impedance current source for said first and second transistors.

* * * * *